(12) United States Patent
Miller (10) Patent No.: US 11,254,059 B2
(45) Date of Patent: Feb. 22, 2022

(54) SYSTEM AND METHOD FOR ADDITIVE MANUFACTURING OF SKIN-FORMULATION APPLICATORS

(71) Applicant: L'OREAL, Paris (FR)

(72) Inventor: Zane Bowman Allen Miller, Seattle, WA (US)

(73) Assignee: L'Oreal, Paris (FR)

( * ) Notice: Subject to any disclaimer, the term of this patent is extended or adjusted under 35 U.S.C. 154(b) by 264 days.

(21) Appl. No.: 15/994,426

(22) Filed: May 31, 2018

(65) Prior Publication Data

US 2019/0366643 A1  Dec. 5, 2019

(51) Int. Cl.
| | |
|---|---|
| B29C 64/393 | (2017.01) |
| B29C 65/00 | (2006.01) |
| B33Y 10/00 | (2015.01) |
| B33Y 50/02 | (2015.01) |
| B33Y 70/00 | (2020.01) |
| B33Y 80/00 | (2015.01) |
| B29L 31/00 | (2006.01) |

(52) U.S. Cl.
CPC ...... *B29C 64/393* (2017.08); *B29C 66/73152* (2013.01); *B29K 2995/007* (2013.01); *B29L 2031/718* (2013.01); *B33Y 10/00* (2014.12); *B33Y 50/02* (2014.12); *B33Y 70/00* (2014.12); *B33Y 80/00* (2014.12)

(58) Field of Classification Search
CPC ............ B29C 64/393; B29C 66/73152; B29C 64/118; B29C 64/386; B29K 2995/007; B29L 2031/718; A45D 34/045; A45D 2200/1018; B33Y 50/00; B33Y 10/00; B33Y 50/02; B33Y 70/00; B33Y 80/00; B33Y 30/00; A46B 2200/1053; A46B 9/021
See application file for complete search history.

(56) References Cited

U.S. PATENT DOCUMENTS

| | | | |
|---|---|---|---|
| 4,706,693 A | 11/1987 | Spector | |
| 2012/0180808 A1* | 7/2012 | Nakamura | A45D 33/006 132/320 |
| 2012/0305022 A1* | 12/2012 | Bickford | A46B 15/0016 132/218 |
| 2013/0032166 A1* | 2/2013 | Kim | A46B 3/005 132/218 |
| 2015/0052024 A1 | 2/2015 | Apsley et al. | |
| 2016/0175408 A1* | 6/2016 | Chang | A61K 38/063 604/506 |
| 2019/0000218 A1* | 1/2019 | Hadasch | A45D 34/042 |

FOREIGN PATENT DOCUMENTS

| | | |
|---|---|---|
| EP | 2389833 A2 | 11/2011 |
| EP | 2471407 A1 | 7/2012 |

OTHER PUBLICATIONS

International Search Report and Written Opinion, dated Aug. 12, 2019, for International Application No. PCT/US2019/033121. (12 pages).

\* cited by examiner

*Primary Examiner* — Tejal Gami
(74) *Attorney, Agent, or Firm* — Christensen O'Connor Johnson Kindness PLLC (57) ABSTRACT

Systems and methods suitable for making skin-formulation applicators through additive manufacturing are described.

17 Claims, 4 Drawing Sheets

SYSTEM AND METHOD FOR ADDITIVE MANUFACTURING OF SKIN-FORMULATION APPLICATORS

SUMMARY

In an aspect, the present disclosure provides a system including an additive manufacturing assembly; and a computing arrangement, operatively coupled to the additive manufacturing assembly, including circuitry configured to operate the additive manufacturing assembly to manufacture a skin-formulation applicator including a first portion having a first durometer and a second portion, different from the first portion, having a second durometer that is different than the first durometer.

In another aspect, the present disclosure provides a method of making a skin-formulation applicator including operating an additive manufacturing assembly according to a skin-formulation applicator design to fabricate the skin-formulation applicator including a first portion having a first durometer and a second portion, different from the first portion, having a second durometer that is different than the first durometer.

This foregoing summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects and many of the attendant advantages of the claimed subject matter will become more readily appreciated as the same become better understood by reference to the following detailed description, when taken in conjunction with the accompanying drawings.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

DETAILED DESCRIPTION

The following discussion provides examples of systems and methods suitable for making skin-formulation applicators through additive manufacturing. Several examples discussed below include systems configured to make skin-formulation applicators having areas of different durometer. In the examples of the systems set forth in more detail below, several are provided with portions of varying durometer that are ergonomically and anatomically designed to provide, for example, precise control of an application of a formula to different portions of the face.

Conventional manufacturing of applicators having regions of varying durometer frequently include over-molding or other multi-step processes. Such conventional manufacturing processes are often time consuming and expensive, particularly for complex shapes or nested parts. Furthermore, such conventional manufacturing techniques are not suitable for easy and fast modification of applicator design by users or other designers of the applicators.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. Further, it will be appreciated that embodiments of the present disclosure may employ any combination of features described herein.

Figure 1:
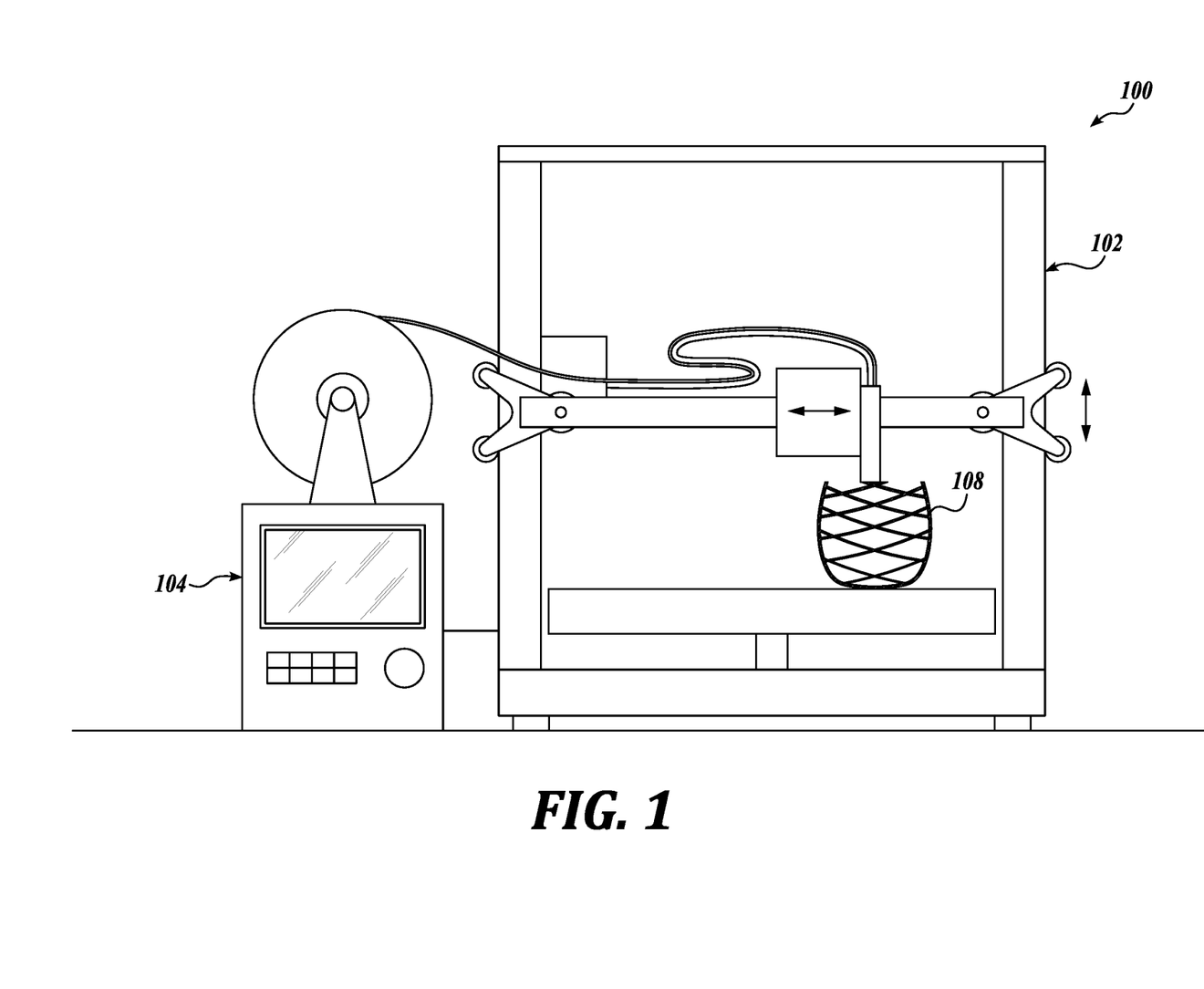
FIG. 1 illustrates a system for additive manufacturing of a skin-formulation application in accordance with an embodiment of the disclosure.

Turning now to FIG. 1 there is shown an example of a system 100 in accordance with embodiments of the disclosure. As shown in FIG. 1, system 100 includes an additive manufacturing assembly 102 and computing arrangement 104 operably coupled to the additive manufacturing assembly 102.

In an embodiment, computing arrangement 104 includes circuitry (not shown, see FIG. 4) configured to operate the additive manufacturing assembly 102 to manufacture a formulation applicator, such as a skin-formulation applicator. As shown, the additive manufacturing assembly 102 of system 100 has partially completed making a skin-formulation applicator 108, in accordance with an embodiment of the disclosure.

As discussed further herein, in an embodiment, system 100 includes circuitry configured to operate the additive manufacturing assembly to manufacture a skin-formulation applicator including a first portion having a first material property attribute and a second portion, different from the first portion, having a second material property attribute that is different than the first material property attribute. In this regard, system 100 is configured to make a skin-formulation applicator having multiple regions or portions suitable for multiple different tasks according to their material property attributes, such as applying a skin formulation to different portions of a body. As discussed further herein, in an embodiment, the material property is chosen from durometer, stiffness, density, hydrophobicity, wettability, reflectivity, conductivity, and texture.

In an embodiment, durometer refers to a measurement of hardness of a material or portion of an item. In an embodiment, the systems disclosed herein include an additive manufacturing assembly; and a computing arrangement, operatively coupled to the additive manufacturing assembly, including circuitry configured to operate the additive manufacturing assembly to manufacture a skin-formulation applicator including a first portion having a first hardness and a second portion having a different hardness from the first portion.

Figure 4:
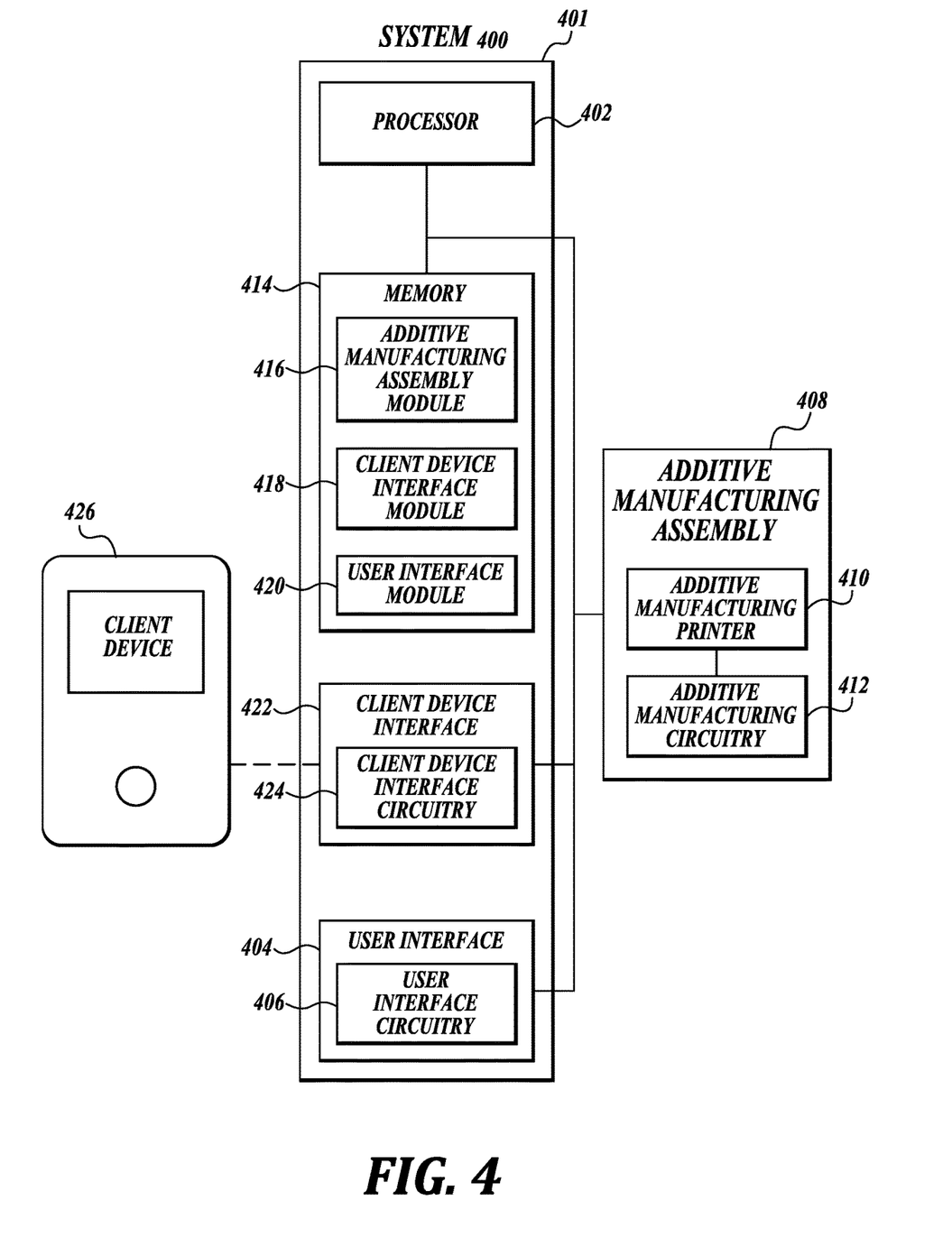
FIG. 4 is a block diagrammatic illustration of the internal operating structure of the system of FIG. 1 and its associated internal assemblies in accordance with an embodiment of the disclosure.

The internal operating structure of a system 400 in accordance with an embodiment of the present disclosure and its associated internal assemblies is shown in block diagrammatic form in FIG. 4. In an embodiment, system 400 is an embodiment of system 100 discussed further herein with respect to FIG. 1. In the illustrated embodiment, system 400 includes memory 414 operatively coupled to processor 402, client device interface 422 shown here operatively coupled a client device 426, user interface 404, and additive manufacturing assembly 408.

An exemplary operating structure of the system 400 includes computing arrangement 401 including a programmed microcontroller or processor 402 configured to control operation of additive manufacturing assembly 408. Further, processor 402 is configured to operate in accordance with program instructions stored in memory 414 or otherwise stored in hardware format for controlling aspects of the additive manufacturing assembly 408.

In the embodiment shown, the additive manufacturing assembly 408 includes additive manufacturing printer 410 and additive manufacturing circuitry 412 operably coupled to the additive manufacturing printer 410 and configured to activate the additive manufacturing printer 410 to make a skin-formulation applicator. See FIG. 1. The additive manufacturing circuitry 412 is configured to activate the additive manufacturing printer 410 in response to inputs received from processor 402, inputs received from one or more modules stored in memory, such as the additive manufacturing assembly module 416, the client device interface module 418, and the user interface module 420, and/or inputs received from other assemblies, such as client device 426.

In an embodiment, the system 400 includes a user interface 404 including user interface circuitry 406 configured to operate the additive manufacturing 408 assembly based on one or more inputs indicative of a user-specific applicator attribute selectable by a user. As used herein, a "user-specific applicator attribute" refers to an attribute of an applicator chosen or otherwise selected by a user. In this regard, a user or other formulation applicator designer can generate a formulation applicator design including one or more user-specific applicator attributes to be manufactured by system 400.

In an embodiment, the computing arrangement 401 includes user interface circuitry 406 is configured to provide a user interface 404 including, for example, a menu (not shown) including one or more user-specific applicator attributes selectable by a user. In an embodiment, the user-specific applicator attribute selectable by a user chosen from a skin-formulation applicator length, a skin-formulation applicator thickness, a skin-formulation applicator aspect ratio, a skin-formulation applicator curvature, a skin-formulation applicator stiffness, a skin-formulation applicator durometer, a skin-formulation applicator durometer gradient, and a number of portions of the skin formulation application configured to contact a portion of a body of a user.

In an embodiment, the user interface 404 is hard wired to the computing arrangement 401. In the illustrated embodiment, the user interface 404 is disposed within the computing arrangement 401. In certain embodiments, the user interface 404 is carried by a client device, such as client device 426. In an embodiment, the user interface 404 includes user interface circuitry 406 configured to provide a user interface to a client device.

In accordance with another embodiment, the system 400 includes circuitry configured to provide a client device interface 422 including circuitry, such as client device interface circuitry 424, configured to detect client device 426. In one embodiment, the client device interface 424 includes client device interface circuitry 426 configured to initiate a discovery protocol that allows the client device 426 and the system 400 to identify each other and exchange user-specific applicator attribute information. In this regard, a user can operate a client device 426 to provide user-specific applicator attribute information to the system 400 and, thereby, modify a skin-formulation applicator design.

The client device 426 in one embodiment is a server, a tablet, a mobile phone, or a laptop computer.

In an embodiment, the circuitry includes one or more remotely located components. In an embodiment, the one or more remotely located components are operably coupled via wireless communication. In that regard, in one embodiment, the client device interface 422 includes client device interface circuitry 424 or the system 400 includes client device interface module 418 configured to enable communication with the client device 426 via a Personal Area Network (PAN), Local Area Network (LAN) or a Wide Area Network (WAN). Accordingly, the client device interface 424 is configured to communicate with a client device 426 using standard wireless protocols (e.g., WiFi, WiMax, Bluetooth, ZigBee, Cellular, Infrared, Nearfield, etc.) or wired protocols (Universal Serial Bus or other serial communications such as RS-234, RJ-45, etc., parallel communications bus, etc.).

Figure 2A:
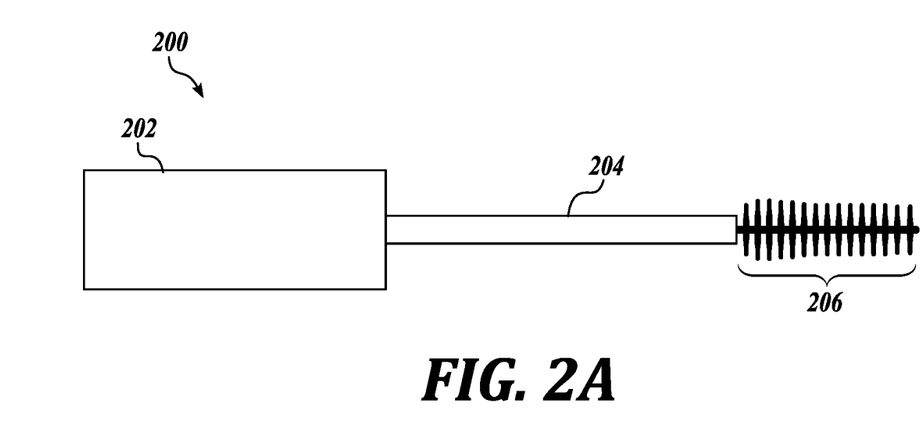
FIG. 2A illustrates a skin-formulation applicator in accordance with an embodiment of the disclosure.

In an embodiment, systems described herein include circuitry configured to operate the additive manufacturing assembly to make formulation applicators including a first portion, such as an application portion, shaped to and having first stiffness suitable to apply a skin formulation to a portion of a body, and a second portion, such as an applicator body, shaped to and having a second stiffness suitable to carry the application portion while applying the formulation to the portion of the body. In that regard, attention is directed to FIG. 2A, which illustrates formulation applicator 200 in accordance with embodiments of the disclosure, formed by systems described herein. FIG. 2A illustrates a formulation applicator 200 including a handle portion 202 shaped, for example, to be grasped by a hand, an applicator body 204, and an application portion 206, in accordance with an embodiment of the disclosure. In the illustrated embodiment, applicator body 204 carries application portion 206, shown here as a plurality of bristles configured to, for example, apply mascara to eyelashes. In an embodiment, applicator body 204 and application portion 206 are made of the same material. By printing the plurality of bristles 206 to have a thickness that is less than a thickness of the applicator body 204, the plurality of bristles 206 and applicator body 204 have different stiffnesses. In this regard, the plurality of bristles have a stiffness suitable to apply mascara to eyelashes, whereas the applicator body 204 has a stiffness suitable carry the plurality of bristles 206 while, for example, applying the mascara to eyelashes.

Figure 2B:
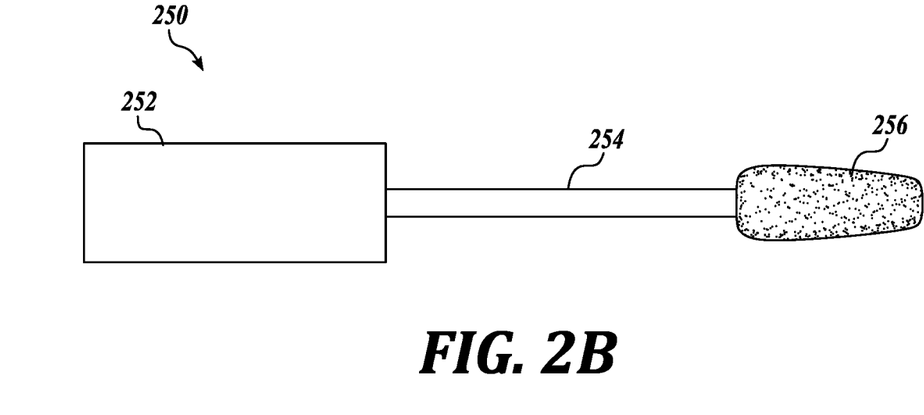
FIG. 2B illustrates another skin-formulation applicator in accordance with an embodiment of the disclosure.

In an embodiment, the computing arrangement of the systems described herein includes circuitry configured to operate the additive manufacturing assembly to manufacture a skin-formulation applicator to include two or more materials. In that regard, attention is directed to FIG. 2B, which illustrates a skin-formulation applicator 250 in accordance with embodiments of the disclosure, formed by systems described herein. As shown, skin-formulation applicator 250 includes handle 252 shaped to be grasped by the hand of a user, applicator body 254, and application portion 256. Applicator body 254 extends between handle 252 and application portion 256 and carries application portion 256. In the illustrated embodiment, the application portion 256 is an application sponge configured to, for example, apply lip gloss to lips. In an embodiment, applicator body 254 is made of a first material having a first durometer and application portion 256 is made of a second material having a second durometer different from the first durometer. For example, in an embodiment, application portion 256 has a relatively low durometer suitable for applying lip gloss to lips, whereas applicator body 254 has a higher durometer than application portion 256 suitable to carry application portion 256 during application of lip gloss to lips. By making a skin-formulation applicator including two or more materials with the systems described herein through additive manufacturing, time-consuming and challenging processes, like over-molding or co-molding, can be avoided. Additionally, the skin-formulation comprises materials suitable for various tasks; in the illustrated embodiment, the relatively low durometer application portion 256 is suitable for application of lip gloss to lips, whereas the higher durometer applicator body 254 is suitable to carry the application portion 256 during application of the formulation.

Figure 3A:
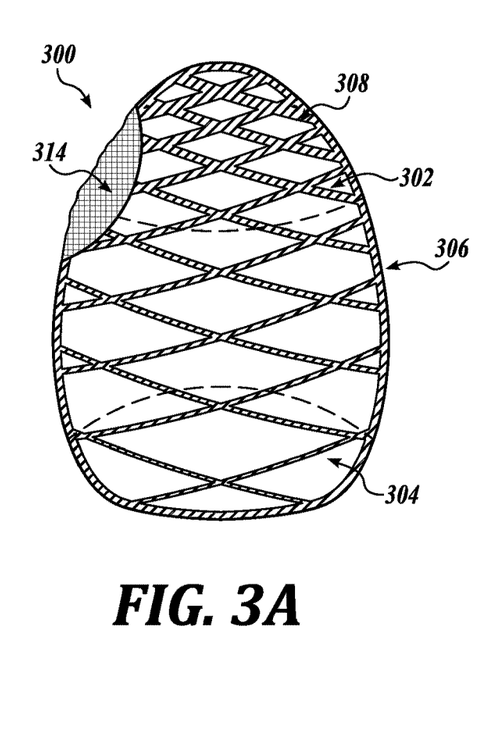
FIG. 3A illustrates a cross-sectional view of another skin-formulation applicator in accordance with an embodiment of the disclosure.
Figure 3B:
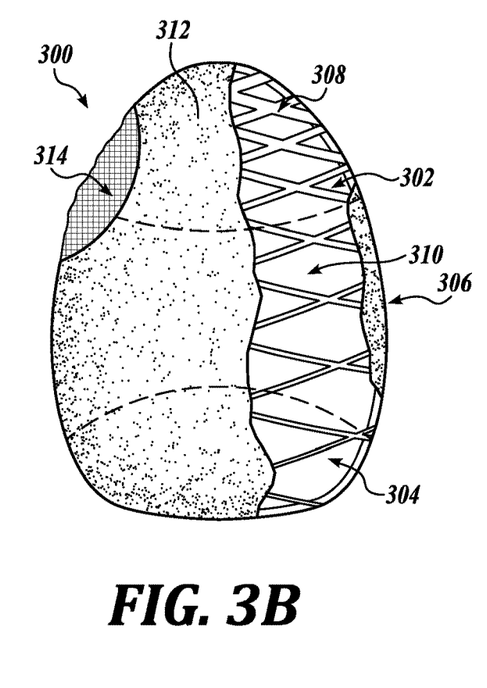
FIG. 3B illustrates a cut-away view of the skin-formulation applicator of FIG. 3A.
Figure 3C:
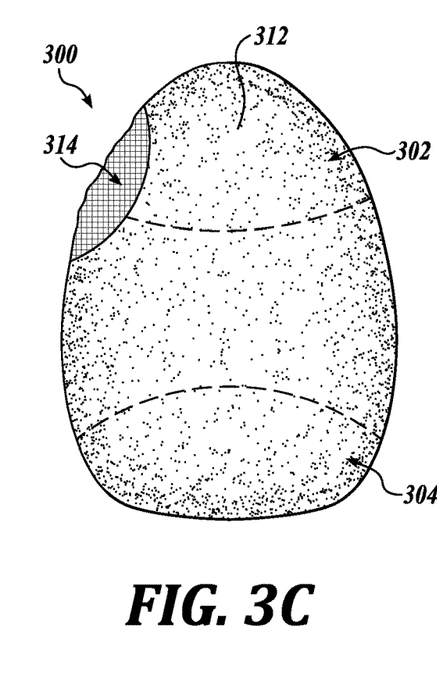
FIG. 3C illustrates a side view of the skin-formulation applicator of FIG. 3A.

In an embodiment, the systems described herein include a computing arrangement including circuitry configured to operate an additive manufacturing assembly to manufacture a skin-formulation applicator to include a porous interior. In that regard, attention is directed to FIGS. 3A-3C, in which skin-formulation applicator 300 formed in accordance with embodiments of the present disclosure is illustrated. FIG. 3A is a cross-sectional view of skin-formulation applicator 300 formed in accordance with an embodiment of the disclosure. FIG. 3B is a cutaway view of the skin-formulation applicator 300 of FIG. 3A. FIG. 3C is a side view of the skin-formulation applicator 300 of FIG. 3A. As shown, skin-applicator 300 includes porous interior 306 including pore walls 308 defining pores 310, and continuous surface 312 at least partially covering porous interior 306.

In the illustrated embodiment, porous interior 306 includes pore walls 308 that define a lattice disposed inside of continuous surface 312. As discussed further herein, the pore wall 308 thickness or pore 310 size can be varied, for example, along a length of the skin-formulation applicator 300. As illustrated, the pore walls 308 of the lattice define regular geometric pores 310, shown here as diamonds. While regular geometric pores 310 are illustrated, it will be understood, however, that other porous interior 306 configurations are possible, such as porous interiors 306 that define, for example, spherical pores, irregular pores, and the like in accordance with other embodiments of the disclosure. In an embodiment, one or more of the pores 310 are closed cell pores in which the individual closed cell pores are completely enclosed by pore walls 308. In another embodiment, one or more of the pores 310 are open cell pores in which the individual open cell pores are not completely enclosed by the pore walls 308.

In an embodiment, the computing arrangement includes circuitry configured to operate the additive manufacturing assembly to manufacture the skin-formulation applicator to have a material property that varies according to position on the skin-formulation applicator. In an embodiment, the material property varies along a length of the skin-formulation applicator. As shown, skin-formulation applicator 300 includes a first portion 302 and a second portion 304. Additionally, as shown, pores 310 have a larger pore size in second portion 304 than in first portion 302. With smaller pore sizes than second portion 304, skin-formulation applicator material occupies a larger proportion of skin-formulation applicator 300 in first portion 302. In this regard, because pore sizes are smaller in the first portion 302 than in the second portion 304, first portion 302 has a higher durometer than second portion 304.

Likewise, pore walls 308 in first portion 302 are thicker than pore walls in second portion 304, as shown in FIG. 3B. Again, in this regard, skin-formulation applicator material occupies a larger proportion of first portion 302 than second portion 304. In this regard, as well, first portion 302 has a higher durometer than a durometer of second portion 304.

In this regard, a single skin-formulation applicator includes portions that are suitable to apply skin formulations to different portions of the body. For example, one portion having a relatively low durometer may be suitable for application of a skin formulation to a sensitive portion of the body, such as skin surrounding an eye, whereas another portion having a higher durometer may be suitable for application of a skin formulation to a less sensitive portion of the body, such as cheeks. Likewise, in an embodiment, the second portion has a higher durometer suitable to be grasped by a hand.

In an embodiment, the computing arrangement includes circuitry configured to operate the additive manufacturing assembly to manufacture the skin-formulation applicator to have a continuous outer surface at least partially surrounding the porous interior. As shown in FIGS. 3A-3C, skin-formulation applicator 300 includes continuous outer surface 312 completely surrounding and enclosing porous interior 306. In other embodiments, the continuous outer surface 312 surrounds only a portion of porous interior 306. In this regard, continuous outer surface 312 encloses any open cell pores 310 of the porous interior 306 covered by the continuous outer surface 312 and provides a surface on which to apply a skin formulation.

In an embodiment, the computing arrangement includes circuitry configured to operate the additive manufacturing assembly to manufacture the skin-formulation applicator to have a continuous outer surface, such as continuous outer surface 312, with varying material properties, such as texture, wettability, hydrophobicity, and the like. In this regard, in an embodiment, the skin-formulation applicator includes a first portion having a texture, wettability, hydrophobicity, etc. suitable to apply a first skin formulation and a second portion having texture suitable to be grasped by a hand. Likewise, in an embodiment, the skin formulation includes a first portion having a texture, wettability, hydrophobicity, etc. suitable to apply skin formulation to a first portion of skin and a second portion having a texture, wettability, hydrophobicity suitable to apply skin formulation to a second, different portion of skin.

In an embodiment, the computing arrangement includes circuitry configured to operate the additive manufacturing assembly to manufacture the continuous outer surface to include one or more depressions. In the illustrated embodiment, skin-formulation applicator 300 includes depression 314 configured to receive a dose of skin formulation. The depression 314 provides the user with a location indicator for placement of the formulation prior to use. In some embodiments, the depression 314 is sized to help control the quantity of formulation a user places onto the applicator 300 for application to, for example, the face. In some embodiments, the depression 314 is omitted.

In another aspect, the present disclosure provides a method of making a skin-formulation applicator. In an embodiment, the additive manufacturing assembly is part of a system, such as system 100 or system 400, including a computing arrangement configured to control the additive manufacturing assembly.

In an embodiment, the method includes operating an additive manufacturing assembly according to a skin-formulation applicator design. In an embodiment, the skin-formulation applicator design is based upon one or more inputs indicative of a user-specific applicator attribute. As discussed further herein with respect to FIG. 4, a user of the systems described herein may provide inputs indicative of a user-specific applicator attribute through, for example, a user interface to generate, at least in part, the skin-formulation applicator design.

In an embodiment, operating an additive manufacturing assembly according to a skin-formulation applicator design includes fabricating the skin-formulation applicator including a first portion having a first material property attribute, such as a first durometer, and a second portion, different from the first portion, having a second material property attribute, such a second durometer, that is different than the first material property attribute.

In an embodiment, operating the additive manufacturing assembly includes operating the additive manufacturing assembly to deposit a first material having a first material property attribute in a first portion of the skin-formulation applicator and a second material in a second portion different than first portion having a second material property attribute different from the first material property attribute. In an embodiment, this includes operating the additive manufacturing assembly to deposit the first material and the second material to provide the second material disposed at least partially around the first material to provide a nested skin-formulation applicator, as discussed further herein with respect to FIG. 2B. As also discussed further herein with respect to FIG. 2B, depositing two or more materials having different material property attributes, such as different durometers, results in a skin-formulation applicator having varying material property attributes.

In an embodiment, operating the additive manufacturing assembly includes operating the additive manufacturing assembly to provide a porous interior, such as a porous interior including a regular geometric lattice. In an embodiment, the porous interior includes pores that vary in size and/or pore wall thickness along a length of the skin-formulation. As discussed further herein with respect to FIGS. 3A-3C, such variations in pore size and pore wall thickness vary material property attributes such as density and durometer of the skin-formulation applicator along the length of the skin-formulation applicator.

Certain embodiments disclosed herein utilize circuitry in order to operably couple two or more components, generate information, determine operation conditions, control an appliance or method, process signals, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof. In an embodiment, circuitry includes one or more ASICs having a plurality of predefined logic components. In an embodiment, circuitry includes one or more FPGA having a plurality of programmable logic components.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like. In an embodiment, circuitry includes a baseband integrated circuit or applications processor integrated circuit or a similar integrated circuit in a server, a cellular network device, other network device, or other computing device. In an embodiment, circuitry includes one or more remotely located components. In an embodiment, remotely located components are operably coupled via wireless communication. In an embodiment, remotely located components are operably coupled via one or more receivers, transmitters, transceivers, or the like.

In an embodiment, circuitry includes one or more memory devices that, for example, store instructions or data. Non-limiting examples of one or more memory devices include volatile memory (e.g., Random Access Memory (RAM), Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of one or more memory devices include Erasable Programmable Read-Only Memory (EPROM), flash memory, or the like. The one or more memory devices can be coupled to, for example, one or more computing devices by one or more instructions, data, or power buses.

In an embodiment, circuitry of the systems described herein includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. The term "about" means plus or minus 5% of the stated value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system comprising:
   an additive manufacturing assembly; and
   a computing arrangement, operatively coupled to the additive manufacturing assembly, including:
      circuitry configured to operate the additive manufacturing assembly to manufacture a skin-formulation makeup applicator including a first portion having a first durometer and a second portion, different from the first portion and connected to the first portion to form the skin-formulation makeup applicator, having a second durometer that is different than the first durometer;
      circuitry configured to provide a user interface including a menu including one or more user-specific applicator attributes selectable by a user, wherein the user interface and the additive manufacturing assembly are co-located in a physical location;
      circuitry configured to operate the additive manufacturing assembly to manufacture the skin-formulation makeup applicator based on one or more inputs indicative of a user-specific applicator attribute of the one or more user-specific applicator attributes selectable by a user received by the user interface; and
      circuitry configured to operate the additive manufacturing assembly to manufacture the skin-formulation makeup applicator to include a porous interior having a first pore size in the first portion and a second pore size, different from the first pore size, in the second portion.

2. The system of claim 1, wherein the computing arrangement includes circuitry configured to operate the additive manufacturing assembly to manufacture the skin-formulation makeup applicator such that durometer of the skin-formulation makeup applicator varies along a length of the skin-formulation makeup applicator.

3. The system of claim 1, wherein the first portion has a first material property attribute and the second portion has a second material property attribute that is different than the first material property attribute, wherein the first material property attribute or second material property attribute is chosen from stiffness, density, hydrophobicity, wettability, reflectivity, conductivity, and texture.

4. The system of claim 1, wherein the computing arrangement includes circuitry configured to operate the additive manufacturing assembly to manufacture the skin-formulation makeup applicator to include a porous interior.

5. The system of claim 4, wherein the computing arrangement includes circuitry configured to operate the additive manufacturing assembly to manufacture the porous interior to include pores having pore sizes that vary along a length of the skin-formulation makeup applicator.

6. The system of claim 4, wherein the computing arrangement includes circuitry configured to operate the additive manufacturing assembly to manufacture the porous interior to have a first pore size in the first portion and a second pore size, different from the first pore size, in the second portion.

7. The system of claim 4, wherein the computing arrangement includes circuit configured to operate the additive manufacturing assembly to manufacture the porous interior to have a first pore wall thickness in the first portion and a second pore wall thickness, different from the first pore wall thickness, in the second portion.

8. The system of claim 4, wherein the computing arrangement includes circuitry configured to operate the additive manufacturing assembly to manufacture the skin-formulation makeup applicator to have a continuous outer surface at least partially surrounding the porous interior.

9. The system of claim 8, wherein the computing arrangement includes circuitry configured to operate the additive manufacturing assembly to manufacture the continuous outer surface to include one or more depressions configured to receive a volume of skin formulation makeup.

10. The system of claim 1, wherein the computing arrangement includes circuitry configured to operate the additive manufacturing assembly to manufacture the skin-formulation makeup applicator to include two or more materials.

11. The system of claim 10, wherein a first material of the two or more materials has a first material property attribute and a second material of the two or more materials has a second material property attribute different from the first material property attribute.

12. The system of claim 1, further comprising circuitry configured to provide a client device interface including circuitry configured to detect a client device and to exchange the user-specific applicator attribute.

13. The system of claim 1, wherein the user-specific applicator, attribute selectable by a user is selected from the group consisting of skin-formulation makeup applicator length, skin-formulation makeup applicator thickness, skin-formulation makeup applicator aspect ratio, skin-formulation makeup applicator curvature, skin-formulation makeup applicator stiffness, skin-formulation makeup applicator durometer, skin-formulation makeup applicator durometer gradient, and number of portions of the skin formulation makeup application configured to contact a portion of a body of a user.

14. The system of claim 1, wherein the computing arrangement includes one or more remotely located components.

15. The system of claim 14, wherein the one or more remotely located components are operably coupled via wireless communication.

16. A method of making a skin-formulation applicator comprising operating an additive manufacturing assembly according to a skin-formulation makeup applicator design to fabricate the skin-formulation makeup applicator including a first portion having a first durometer and a second portion, different from the first portion and connected to the first portion to form the skin-formulation makeup applicator, having a second durometer that is different than the first durometer, wherein the skin-formulation makeup applicator design is based upon one or more inputs indicative of a user-specific applicator attribute, wherein the user-specific applicator attribute is generated by a user interface operably coupled to the additive manufacturing assembly and in response to receiving one or more user inputs, wherein the user interface and the additive manufacturing assembly are co-located in a physical location, and wherein the skin-formulation makeup applicator include a porous interior having a first pore size in the first portion and a second pore size, different from the first pore size, in a second portion.

17. A system comprising:
an additive manufacturing assembly; and
a computing arrangement, operatively coupled to the additive manufacturing assembly and co-located in a physical location with the additive manufacturing assembly, the computing arrangement including:
circuitry configured to operate the additive manufacturing assembly to manufacture a skin-formulation makeup applicator including a first portion having a first durometer and a second portion, different from the first portion and connected to the first portion to form the skin-formulation makeup applicator, having a second durometer that is different than the first durometer; and
circuitry configured to operate the additive manufacturing assembly to manufacture the skin-formulation makeup applicator to include a porous interior having a first pore size in the first portion and a second pore size, different from the first pore size, in the second portion.

* * * * *

UNITED STATES PATENT AND TRADEMARK OFFICE
CERTIFICATE OF CORRECTION

| | | |
|---|---|---|
| PATENT NO. | : 11,254,059 B2 | Page 1 of 1 |
| APPLICATION NO. | : 15/994426 | |
| DATED | : February 22, 2022 | |
| INVENTOR(S) | : Z. Miller | |

It is certified that error appears in the above-identified patent and that said Letters Patent is hereby corrected as shown below:

In the Claims

| Column | Line | |
|---|---|---|
| 11 | 18 | in Claim 16, change "include" to -- includes --. |

Signed and Sealed this
Seventh Day of March, 2023

Katherine Kelly Vidal
*Director of the United States Patent and Trademark Office*